(12) United States Patent
Hutchinson et al.

(10) Patent No.: US 7,402,915 B2
(45) Date of Patent: Jul. 22, 2008

(54) PEDAL GENERATOR

(75) Inventors: John Edward Hutchinson, London (GB); Pierre Becker, London (GB)

(73) Assignee: Freeplay Market Development Limited (GB)

( * ) Notice: Subject to any disclaimer, the term of this patent is extended or adjusted under 35 U.S.C. 154(b) by 116 days.

(21) Appl. No.: 10/552,943

(22) PCT Filed: Apr. 15, 2004

(86) PCT No.: PCT/GB2004/001669

§ 371 (c)(1),
(2), (4) Date: Oct. 2, 2006

(87) PCT Pub. No.: WO2004/095674

PCT Pub. Date: Nov. 4, 2004

(65) Prior Publication Data

US 2007/0052240 A1  Mar. 8, 2007

(30) Foreign Application Priority Data

Apr. 16, 2003  (GB) .................................. 0308824.2

(51) Int. Cl.
 *F02B 63/04* (2006.01)
 *F03G 7/08* (2006.01)

(52) U.S. Cl. .......................... 290/1 A; 290/1 C; 290/1 E
(58) Field of Classification Search ................ 290/1 R, 290/1 A, 1 C, 1 E, 39; 322/1
See application file for complete search history.

(56) References Cited

U.S. PATENT DOCUMENTS

| | | | | |
|---|---|---|---|---|
| 4,084,810 A | * | 4/1978 | Forsman | 482/5 |
| 4,612,447 A | * | 9/1986 | Rowe | 290/1 R |
| 4,746,806 A | * | 5/1988 | Campagnuolo et al. | 290/1 R |
| 4,942,936 A | * | 7/1990 | Gardner, Jr. | 180/207 |
| 5,386,745 A | * | 2/1995 | Inokuchi | 81/57.3 |
| 5,833,348 A | * | 11/1998 | Bailey, Jr. | 362/473 |
| 6,104,096 A | * | 8/2000 | Hicks | 290/1 R |
| 6,374,695 B1 | * | 4/2002 | Johansson et al. | 74/512 |
| 6,930,403 B2 | * | 8/2005 | Hartman et al. | 290/1 A |
| 6,987,327 B1 | * | 1/2006 | Lucatero | 290/1 A |
| 7,253,534 B2 | * | 8/2007 | Vasilovich et al. | 290/1 R |

* cited by examiner

*Primary Examiner*—Nicholas Ponomarenko
(74) *Attorney, Agent, or Firm*—Finnegan, Henderson, Farabow, Garrett & Dunner, LLP.

(57) ABSTRACT

A pedal generator having a single foot operated pedal, and spring biased means for converting oscillatory movement of the pedal into drive for an alternator, the pedal comprises a pedal lever (2) connected to a drive shaft (3) and movable between raised position and a lowered position so that a user can impart rotation to the drive shaft (3).

11 Claims, 6 Drawing Sheets

PEDAL GENERATOR

CROSS REFERENCE TO RELATED APPLICATIONS

This application is a National Phase Application based on PCT/GB2004/001669, filed on Apr. 15, 2004, and claims the priority of Great Britain Patent Application No. 0308824.2, filed on Apr. 16, 2003, the content of all of which is incorporated here in by reference.

The present invention concerns pedal generators for generating electrical current.

It is well known to provide a pedal generator based on the design of a standard bicycle in which the operator sits on a seat and uses both feet to drive pedals attached to a gear system which drives an alternator.

This is undoubtedly the most efficient form of generating electrical power using physical input. Not only is it ergonomically efficient but such a system can provide the alternator with a constant input under which condition it performs most efficiently. However such systems have the problem that they are relatively bulky. Accordingly the present invention has as a concern to provide a power generator which is compact and easy to transport yet which can provide adequate electrical power to, for example, top up a 12 volt battery, charge a mobile phone or computer or provide temporary lighting. Of course there are many other possible uses for such a generator in places where mains power is not readily available.

In accordance with an aspect of the invention there is provided a pedal generator having a single foot operated pedal, and spring biased means for converting oscillatory movement of the pedal into drive for an alternator.

The spring biased means may comprise a tensioned belt portion which is moved over a toothed drive pulley each time the pedal lever is moved. Preferably the drive pulley has a one-way clutch.

In order that the present invention may be more readily understood an embodiment thereof will now be described by way of example and with reference to the accompanying drawings, in which.

Figure 1:
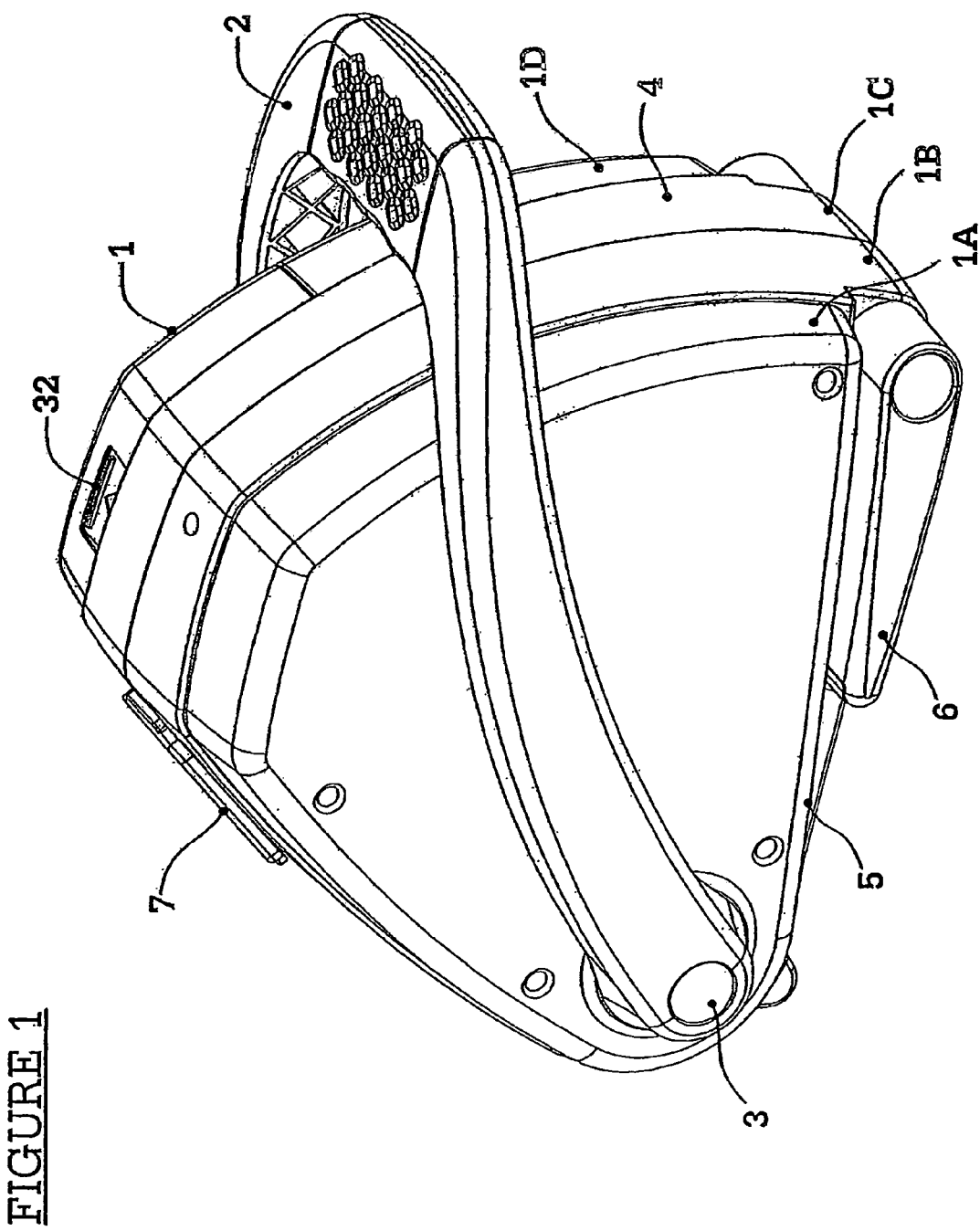
FIG. 1 is a perspective view of a pedal generator according to an embodiment of the present invention.

Referring now to the drawings, FIG. 1 is a perspective view of an embodiment of a pedal powered electricity generator in accordance with the present invention. The generator comprises a main outer casing 1 preferably made from a high impact and tough plastics material, though of course any other suitable material can be used. The casing is made from four main sections labelled 1a, 1b, 1c and 1d which are held together by bolts. A substantially U-shaped pedal lever 2 is mounted on a drive shaft 3 which extends through the casing. As can be seen from FIG. 1 the front face 4 of the casing is substantially arcuate with the radius of curvature being slightly less than the length of the arms of the pedal lever 2 so that the pedal lever 2 can pivot in an arc about the drive shaft 3 axis without fouling the casing surface. Mounted at the base 5 of the generator is a pair of feet 6 only one of which is shown in FIG. 1, as FIG. 1 shows the feet 6 in their stowed position. In operation the feet 6 are pivoted downwardly through 180° so as to extend in front of the base 5 so as to provide stabilisation against the pedalling action of a user of the generator.

Also shown in FIG. 1 is a panel 7 which includes a cigarette lighter type socket and a DC 12 volt socket. Finally FIG. 1 shows a small part of a rear stabilizer 8 which extends transversely across the base of the pedal generator at the opposite end to the feet 5.

Figure 2:
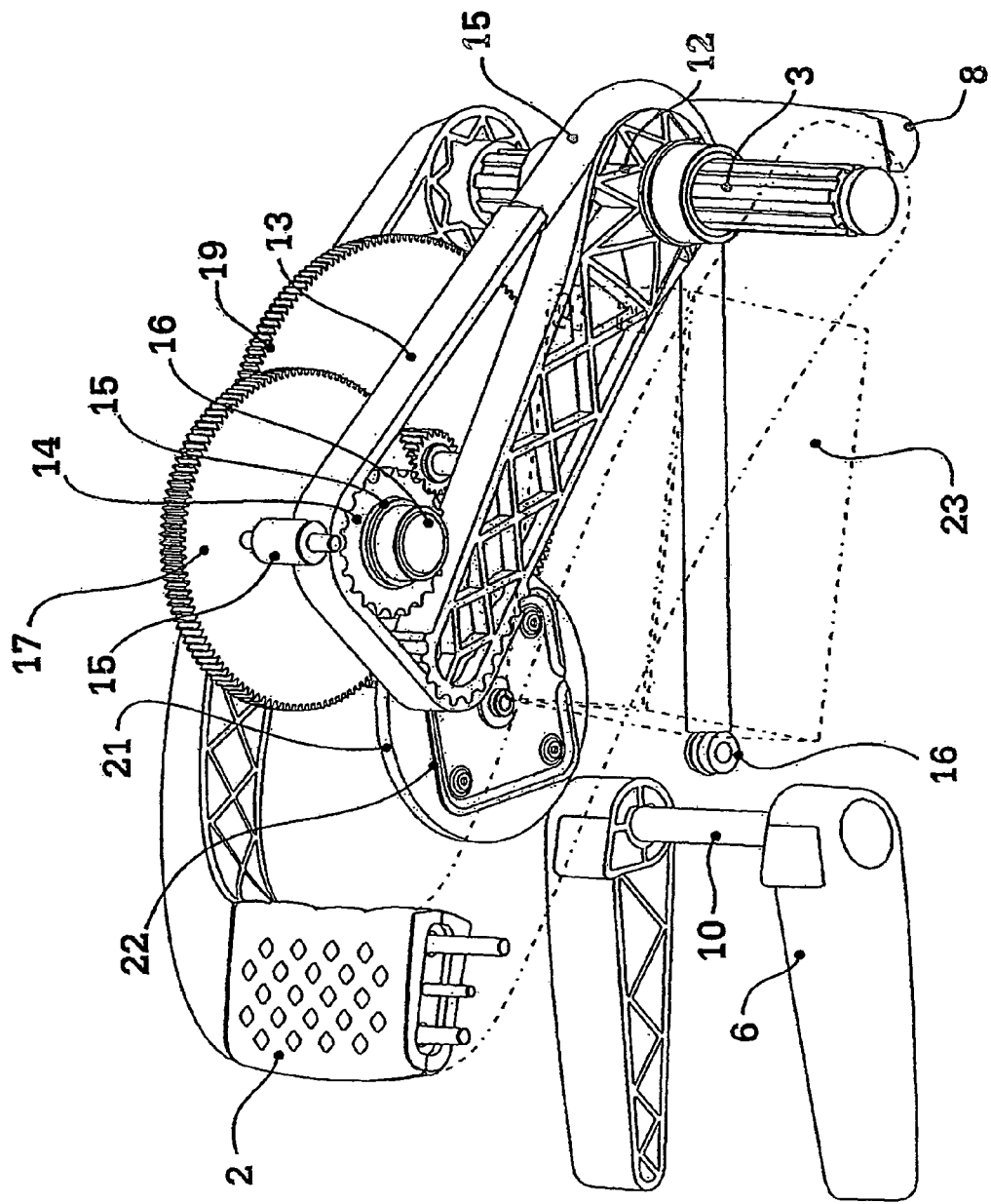
FIG. 2 is a partially cut-away view of the main components of the pedal generator of FIG. 1.

Referring now to FIG. 2 of the drawings, this is a perspective view of the generator of FIG. 1 shown with the casing 1 removed. In FIG. 2 the feet 6 are shown in their operational position. As can be seen they are mounted on a shaft 10 extending through the casing and are held on this shaft by caps 11. Fixedly mounted on the drive shaft 3 is a cantilever arm 12 the curved remote end of which carries a number of transverse teeth. This arm 12 is mounted on the drive shaft 3 so as to be substantially parallel to the pedal lever 2. In use the pedal generator is stood on its base with feet 6 extended from the stowed position as shown in FIG. 2. A user then places a foot on the pedal and repeatedly depresses it. Depression of the pedal lever 2 by a user pivots the drive shaft 3 causing a corresponding degree of arcuate movement in the arm 12. The teeth of the arm 12 engage in corresponding transverse slots formed in the inner surface of a flexible member 13. In the present embodiment the flexible member is a portion of a belt similar to cam belts used in internal combustion engines. However the flexible member can be a linked chain. The flexible member 13 also extends over a toothed input pulley 14 so that the teeth of the input pulley 14 also engage in the slots formed in the underside of the toothed belt portion. It will thus be appreciated that when the arm 12 is pivoted downwardly by operation of the pedal lever the downward movement of the cantilever or belt puller arm 12 moves the belt portion 13 in an anticlockwise direction so as to rotate the input pulley 14. Return movement of the pedal lever 2 reverses the direction of rotation of the input pulley 14. A tension spring 15 is connected between one end of the belt 13 and a fixed point 16 provided internally in the pedal generator so that downward movement of the arm 12 caused by a corresponding movement of the pedal lever 2 stretches the tension spring and release of pressure on the pedal lever causes the tension spring to pull the arm 12 back into the position shown in FIG. 2. A belt retaining bush 15 holds the flexible member 13 against the toothed input pulley 14 which is coupled by a one-way clutch bearing 15 to drive an input shaft 16 to which is fixedly mounted a main input gear 17. Main input gear 17 drives a pinion 18 which transmits the rotation of the input gear to a toothed secondary gear 19. This secondary gear drives a final alternator pinion 20 (see FIGS. 3 and 4) mounted on a flywheel 21 carrying a rotor cup, magnet and a flux path to be described later. A stator plate 22 which forms part of an alternator is mounted on an internal wall of the main casing. The gearing just described is arranged so that one rotation of the input shaft will effectively cause thirty rotations of the final drive to the alternator.

Figure 3:
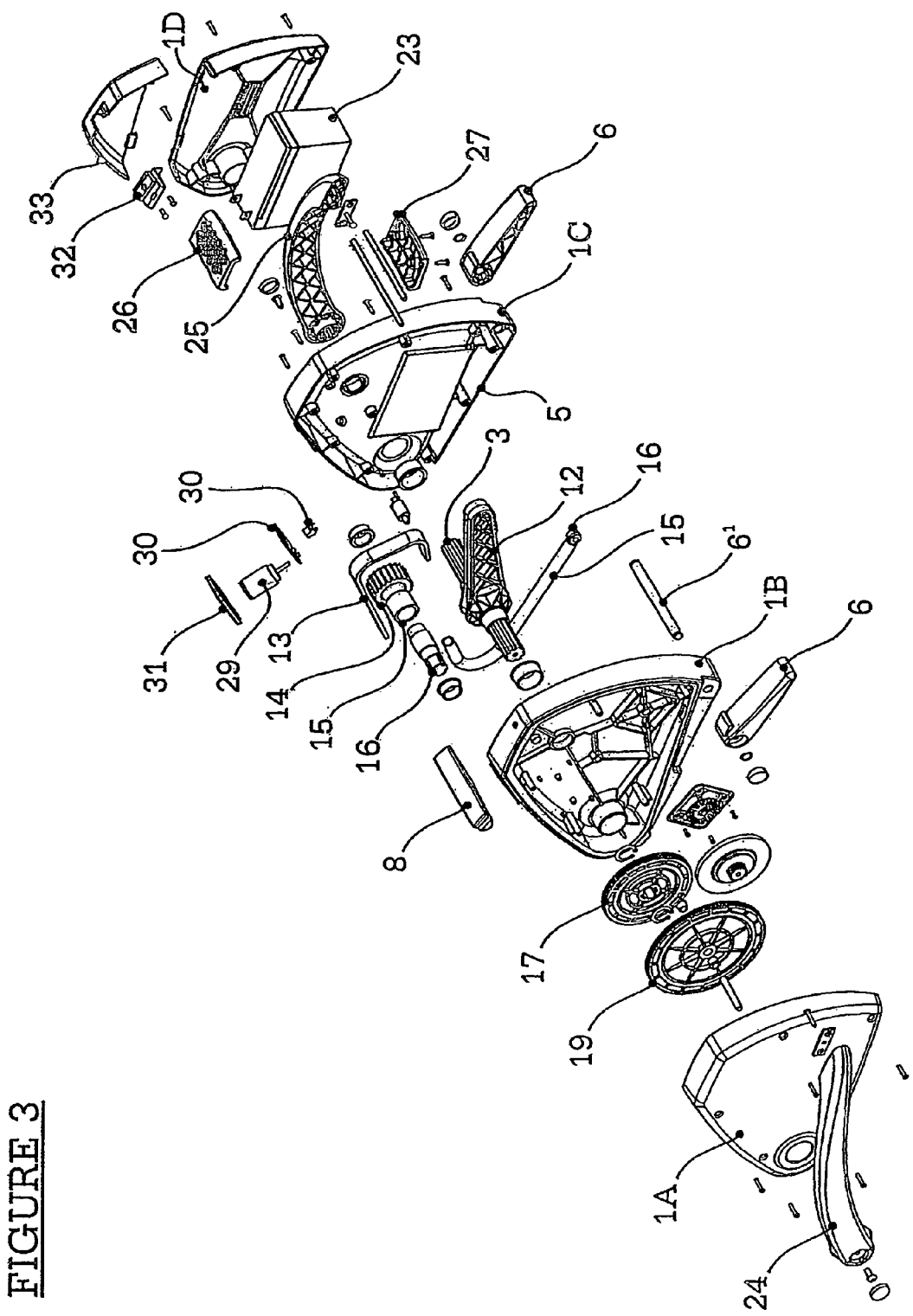
FIG. 3 is an exploded view showing in greater detail the components of the pedal generator of FIG. 1.

Turning now to FIG. 3 of the drawings this shows an exploded view of the pedal generator which has just been described in relation to FIGS. 1 and 2. Thus those integers which are common to the first two drawings have been given the same reference numerals. Additionally the shaft on which the feet 6 are mounted has been given the number 6'. As can be seen in FIG. 3 (and as is shown in dotted outline in FIG. 2) the generator houses a battery 23 which can be a 12 volt or any other voltage as required and which can be charged either by the alternator or from an external power source.

The system can readily be configured to charge the battery of another device.

As can be seen in FIG. 3 the pedal lever 2 comprises a pair of respective left and right input levers 24, 25 mounted at opposite ends of drive shaft 3 with their free ends connected by a pedal portion made from a pair of main pedal parts 26, 27.

The cigarette lighter-type socket referred to with respect to FIG. 1 is shown at 29 and the DC socket at 30. Also shown is a control panel 30 and a panel cover 31. Naturally there can be other configurations of input/output sockets. Additionally voltage conversion means can be provided so that a selectively variable output can be generated.

Other detailed components shown in FIG. 3 and not in the more general FIGS. 1 and 2 include a latch 32 for retaining a detachable lid 33 forming part of the extreme right section 1D so as to provide access to the terminals of the battery 23. The unlabelled elements shown in FIG. 3 essentially comprise bolts or screws for holding components together, bushes, and shafts.

Figure 4:
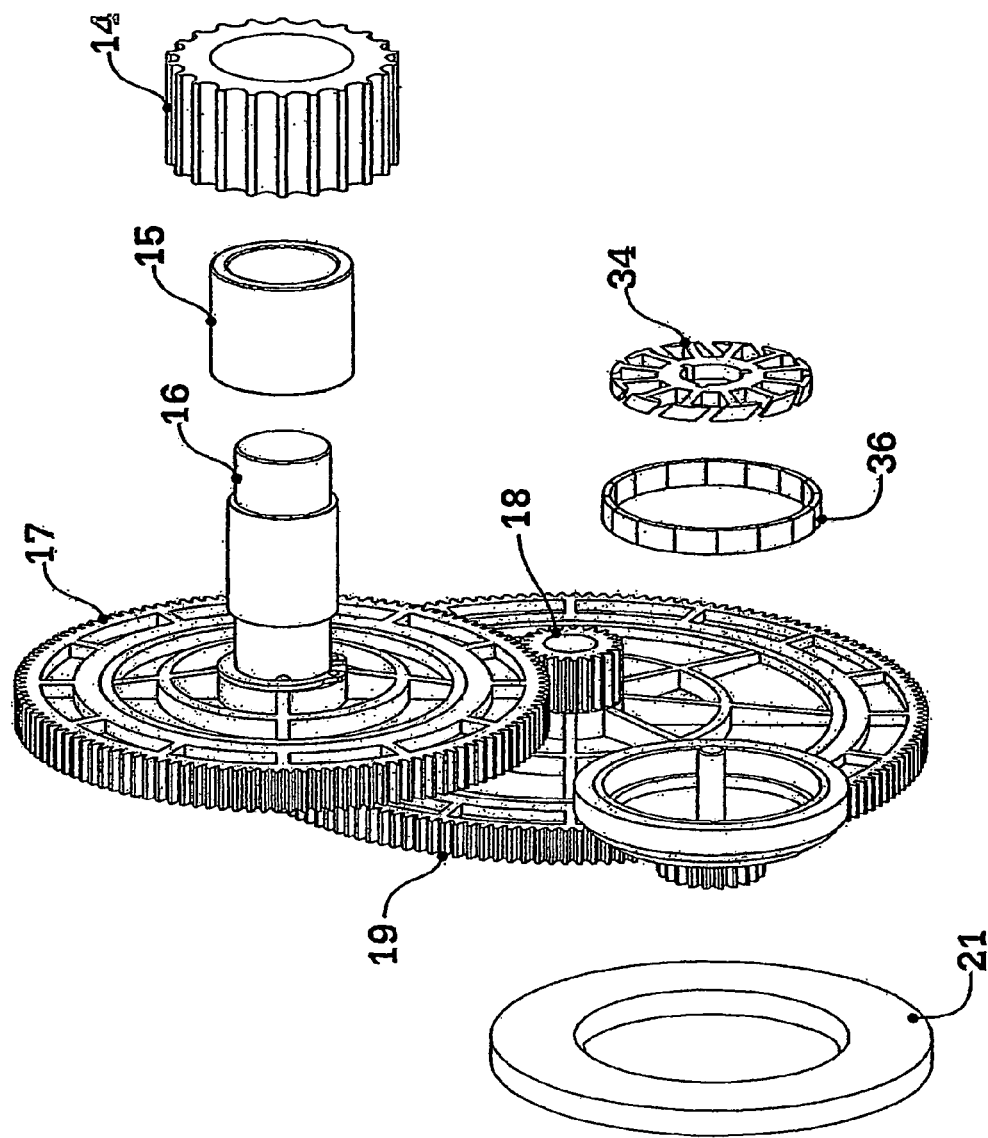
FIG. 4 is a view of the gear train and the alternator of the embodiment of FIG. 1.

Referring now to FIG. 4 of the drawings this shows the drive gear train and the alternator, the latter in exploded form. As before integers already described with regard to previous Figures have been given the same reference numerals. It comprises an alternator stator 34 carrying on its radial arms copper windings (which are not shown) and an alternator rotor cup 35 in which are mounted magnet segments 36 which provide the rotor poles and a metal ring 36' which provides a flux path for the alternator. The stator pack 34 is made up of a number of laminations of thin steel so as to reduce eddy currents and their associated losses. The alternator uses a three phase stator winding with nine stator teeth and twelve rotor poles making in total six pole pairs. It is of course possible that more than three phases may be used. The alternator rotor 35 is in the form of a flattened cup with a boss. The pinion 20 and rotor cup assembly is mounted on this boss so as to be rotated by secondary gear 19.

Figure 5:
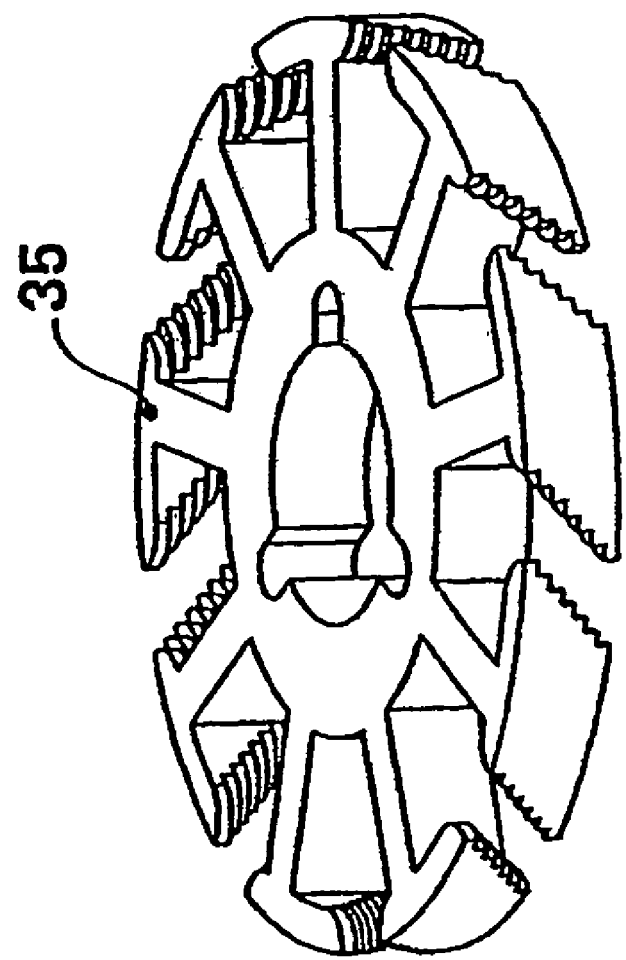
FIG. 5 is a perspective view of the stator of the alternator shown in FIG. 4.

The magnets used in the alternator are a high grade of neodium-iron-boron (NFeB, or NiB) sintered rare earth magnets. The alternator has a relatively high initial cogging torque, which is multiplied backwards by the transmission ratio, so that an unacceptably high starting torque can result. In order to reduce the effect of this cogging torque the faces of the stator teeth are skewed about the alternator axis the stator pack in this embodiment are skewed about the alternator axis. It is possible for the laminations to be identical with each lamination angularly skewed with respect to its neighbouring laminations in order to achieve the necessary skewed effect. It is, however, preferred for the laminations to differ. This is because it has been found that the performance of the stator can be improved by not using identical laminations each of which is angularly displaced with respect to its neighbour. Accordingly the requisite skewing effect of the stator teeth can be provided by varying each lamination and specifically by varying the teeth of the laminations as shown in FIG. 5. It will be seen that each tooth extends on either side of its stator arm with the anti-clockwise extension of the teeth of the uppermost lamination being substantially longer than the clockwise hand extension. The skewed effect is obtained by progressively reducing the anti-clockwise extensions and progressively increasing the clockwise extensions. This arrangement enables the copper windings around the arms of the stator to be more effective as the cross-sections of the actual arms are not skewed so that it is no longer necessary to skew the alternator rotor magnets. In either case the skewing of the laminations has the secondary effect of smoothing the torque input and giving quiet operation even during high power generation. The alternator rotor 35 is preferably mounted in a sintered brass bush impregnated with very low friction lubricant.

Figure 6:
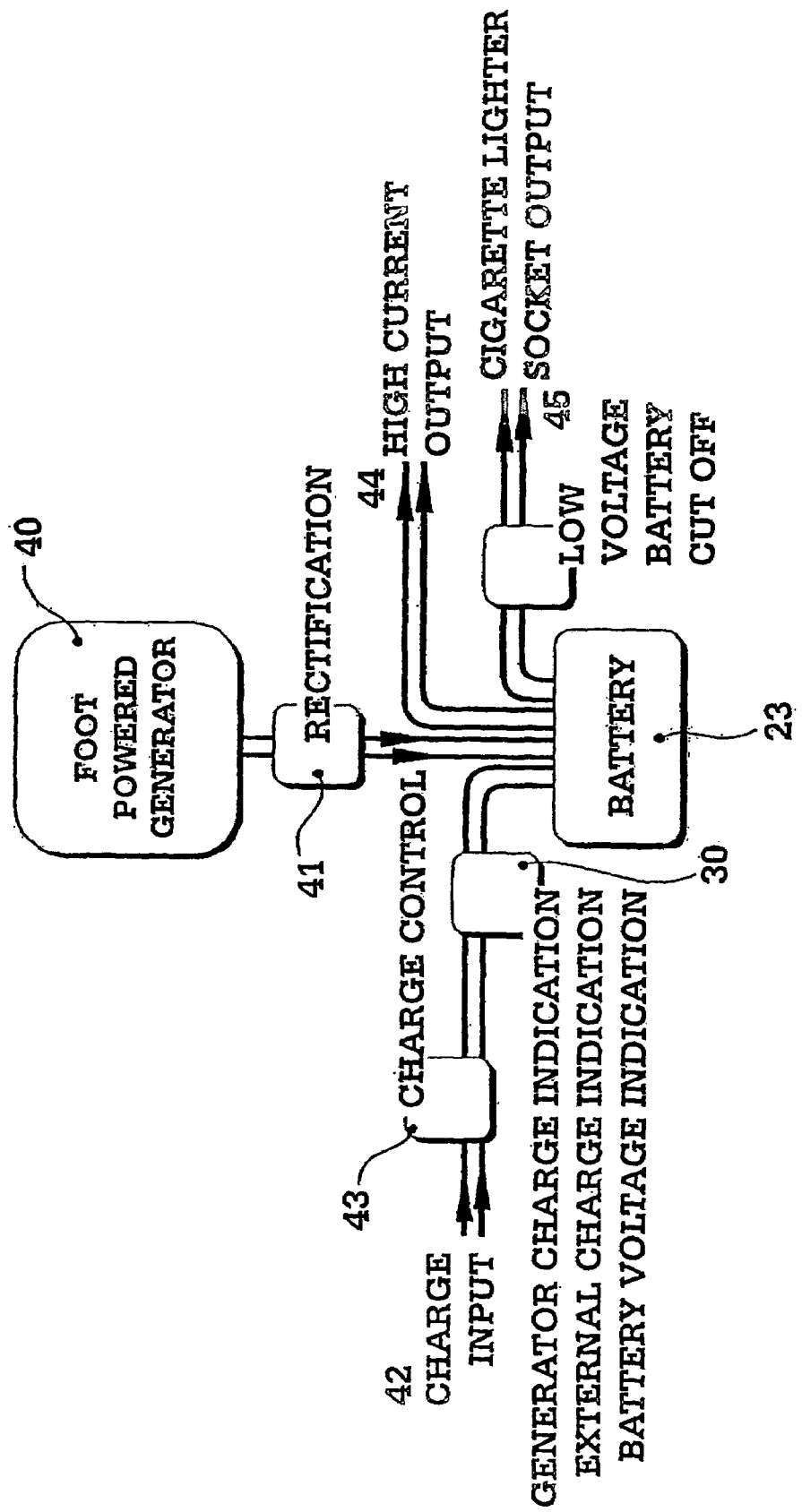
FIG. 6 is a block diagram of the electrical components of the pedal generator of FIG. 1.

Turning now to FIG. 6 of the accompanying drawings this shows a block diagram of the circuitry of the pedal generator. Thus the mechanical components of the generator are indicated at 40 with the output of the alternator being connected to a rectifier circuit 41 providing a DC output to the battery 23. In the present embodiment the battery can also be charged from a charge input 42 connectable to a main supply (not shown) via a charge control circuit 43. The control panel already mentioned has LED indications (not shown) which show to a user that the battery 23 is being charged externally from the charge input, that the battery is being charged from the pedal generator's own alternator, and an indication of the battery voltage. Also provided is a high amount output 44 and an output to the cigarette lighter socket output 28. Additionally there is provided a circuit 45 for cutting off power supply when the battery charge falls below a predetermined level. The electrical components just described are also of standard construction and accordingly will not be described in detail.

The invention claimed is:

1. A pedal generator comprising a pedal lever connected to a drive shaft and movable between a raised position and a lowered position so that a user can impart rotation to the drive shaft:
    an arm one end of which is mounted on said drive shaft so as to be pivotable through an arc on movement of the pedal lever between its raised and lowered positions so as to cause rotation an input drive pulley in response to movement of the arm;
    a one-way clutch coupling the input drive pulley to the first gear of a gear train arranged to drive an alternator, the first gear being rotated by the drive pulley when the pedal lever is depressed from its raised position, and wherein the end of the arm remote from the drive shaft is coupled to an elongate flexible member which is also coupled to the drive pulley so that movement of the flexible member in response to movement of the arm causes rotation of the input drive pulley.

2. A pedal generator according to claim 1, wherein the end of the arm remote from the drive shaft is curved and has a plurality of external teeth which engage in complementary teeth provided on the underside of the elongate flexible member, and wherein the drive pulley is also toothed with the teeth of the input drive pulley engaging with teeth on the underside of the flexible member so that movement of the flexible member in response to movement of the arm causes the rotation of the input drive pulley.

3. A pedal generator according to claim 2, including means for biasing the return of the pedal lever to the raised position.

4. A pedal generator according to claim 3, wherein one end of the flexible member is secured to the arm and the other end of the flexible member is secured to a biasing spring which is stretched when the pedal lever is depressed so as to provide the biasing which assists the return of the pedal lever to its raised position.

5. A pedal generator according to claim 4, wherein the input drive pulley is mounted above the curved end of the arm with respect to the downward movement of the arm between the elongate elastic member and the curved end of the arm, and the first gear driven by the input drive pulley engages a toothed pinion coaxially mounted on a second toothed drive gear.

6. A pedal generator according to claim 1, wherein the second drive gear engages an alternator pinion driving the rotor assembly of the alternator.

7. A pedal generator according to any preceding claim, wherein the alternator comprises a stator stack skewed to reduce cogging effects and surrounded by a multi-pole magnetic ring mounted in a rotor cup rotated by the alternator pinion.

8. A pedal generator according to claim 1, wherein the rotor cup carries a flywheel.

9. A pedal generator according to claim 1, wherein the pedal generator comprises a main body housing having a base by means of which the pedal generator can rest on a solid surface, said drive shaft being provided at one end of the base with the pedal lever comprising a substantially U-shaped body the arms of which extend on either side of the main housing.

10. A pedal generator according to claim 1, wherein the end face of the main housing about which the pedal lever moves when depressed is curved about a radius less than the radius of the pedal lever, and wherein the curved end of the main housing is provided with extendible feet for providing stabilisation of the pedal generator when mounted.

11. A pedal generator according to any preceding claim and further comprising a mount for mounting a battery, an output terminal for a mounted battery, and a controller for controlling charging of a battery either by the output of said alternator or from an external power source.

* * * * *

UNITED STATES PATENT AND TRADEMARK OFFICE
CERTIFICATE OF CORRECTION

| | | |
|---|---|---|
| PATENT NO. | : 7,402,915 B2 | Page 1 of 1 |
| APPLICATION NO. | : 10/552943 | |
| DATED | : July 22, 2008 | |
| INVENTOR(S) | : John Edward Hutchinson et al. | |

It is certified that error appears in the above-identified patent and that said Letters Patent is hereby corrected as shown below:

Title page, Item 75, inventors, citizenship of the inventors should read -- Cape Town, South Africa -- and not "Great Britain."

Signed and Sealed this

Ninth Day of September, 2008

JON W. DUDAS
*Director of the United States Patent and Trademark Office*